(12) United States Patent
Hansen

(10) Patent No.: US 8,264,229 B2
(45) Date of Patent: Sep. 11, 2012

(54) ELECTROMAGNETIC GEOLOGICAL METROLOGY SYSTEM

(76) Inventor: Tom Roger Hansen, Bergen (NO)

( * ) Notice: Subject to any disclaimer, the term of this patent is extended or adjusted under 35 U.S.C. 154(b) by 862 days.

(21) Appl. No.: 12/178,213

(22) Filed: Jul. 23, 2008

(65) Prior Publication Data

US 2010/0019770 A1    Jan. 28, 2010

(51) Int. Cl.
*G01V 3/00* (2006.01)
(52) U.S. Cl. .................. 324/365; 324/346; 324/323
(58) Field of Classification Search .................. None
See application file for complete search history.

(56) References Cited

U.S. PATENT DOCUMENTS

| | | | |
|---|---|---|---|
| 3,169,242 A * | 2/1965 | Davis et al. | 340/10.4 |
| 3,369,217 A | 2/1968 | Luehrmann et al. | |
| 6,512,371 B2 * | 1/2003 | Prammer | 324/303 |
| 6,914,433 B2 | 7/2005 | Wright et al. | |
| 2009/0140723 A1 * | 6/2009 | Ronaess et al. | 324/202 |
| 2009/0204330 A1 * | 8/2009 | Thomsen et al. | 702/14 |
| 2009/0265111 A1 * | 10/2009 | Helwig et al. | 702/7 |
| 2010/0057363 A1 * | 3/2010 | Amundsen | 702/5 |

* cited by examiner

Primary Examiner — Melissa Koval
Assistant Examiner — Trung Nguyen
(74) Attorney, Agent, or Firm — McDermott Will & Emery LLP

(57) ABSTRACT

An electromagnetic geological metrology system comprises:
(a) a transmitter arrangement for generating outbound radiation towards a geological formation;
(b) a receiver arrangement for receiving reflected electromagnetic radiation reflected from the geological formation and generating corresponding one or more received signals; and
(c) a data processing arrangement for processing the one or more received signals,
The system is distinguished in that:
(d) the transmitter arrangement includes an antenna arrangement coupled via a switching arrangement to an energy storage arrangement; and
(e) the switching arrangement is operable to discharge energy stored in the energy storage arrangement for generating the outbound radiation.

1 Claim, 8 Drawing Sheets

ELECTROMAGNETIC GEOLOGICAL METROLOGY SYSTEM

FIELD OF THE INVENTION

The present invention relates to electromagnetic geological metrology systems, for example to systems which are operable to interrogate geological formations for determining potential hydrocarbon deposits therein. Moreover, the present invention also relates to methods of employing such systems for performing electromagnetic metrology on geological formations. Furthermore, the invention concerns software products stored on data carriers, wherein the software products are executable on computing hardware for assisting when implementing the methods.

BACKGROUND OF THE INVENTION

Within the Earth's geological formations, oil and gas deposits are relatively rare. In order to form oil and gas deposits, the geological formations need to include anticlines for storing organic material in a stable manner for long periods of time. Moreover, specific conditions of temperature and pressure need to prevail during a period of many millions of years for the oil and gas deposits to form in the anticlines. If these specific conditions are not satisfied, either coal is formed or alternatively no hydrocarbon deposits are formed.

Present methods of performing metrology within geological formations are based upon seismic measurements and electromagnetic measurements. Land-based seismic measurements involve deploying seismic sensors over a region of the Earth's surface in contact with the Earth, and then detonating an explosive charge to create seismic shockwaves within the Earth. The shock waves propagate to a geological formation and are at least partially reflected by acoustic impedance mismatches at interfaces between mutually different rock layers in the formation. Reflected seismic shock waves are subsequently received at the seismic sensors to generate signals which are processed to generate a seismic image of the geological formation. Although the seismic image is able to provide information regarding regions of rock, it is often not a reliable method of ascertaining whether or not hydrocarbon deposits such as oil or gas are present in a given anticline. Seismic investigations are often complemented by expensive drilling activities which, in certain situations, yield a negative result of no oil or gas being present.

When exploring for oil in off-shore locations, mounting seismic sensors onto a sea-bed region and then detonating an explosive charge within the sea-bed region is a time-consuming and expensive activity. Moreover, drilling activities at off-shore locations are considerably more expensive than on land locations, placing an even greater burden on initial seismic measurements providing a representative indication whether or not oil and/or gas deposits are present.

Such technical difficulties and associated high costs for performing off-shore drilling have prompted development of alternative techniques for finding subterranean oil and/or gas deposits. For example, in a presently pending Norwegian patent application no. 20053085, there is described an electromagnetic method of investigating a region which potentially includes a subterranean hydrocarbon reservoir. The method employs an apparatus which is submerged in operation and towed near a geological region to be investigated. The method involves launching from the apparatus an electromagnetic interrogation signal into the geological region, receiving complex multipath reflected signals from the region in response to the interrogation signal being received at the geological region, resolving the reflected signals into at least two orthogonal spatial axes and then comparing a phase relationship of the received reflected signals along these two axes for determining whether or not hydrocarbon is present. The apparatus employs a single horizontal dipole antenna driven by a signal generator. Other granted Norwegian patents, for example Norwegian patent no. 325116 discloses use of electromagnetic waves for determining a presence of subterranean hydrocarbon reservoirs. Such methods are conveniently referred as being "Controlled Source Electro Magnetic" (CSEM).

A problem encountered is that these apparatus operable to be towed in a submerged state for generating relatively-high intensity electromagnetic radiation is that they are costly to build and deploy. Moreover, their electromagnetic radiation output power is limited by employing signal generators for driving transmitting dipole antennae.

For example, there has earlier been employed controlled electromagnetic sources for driving antennae of these aforementioned apparatus, for example sources operable to output formed square-wave signals, saw-tooth signals, and sinusoidal and modulated sinusoidal signals. Presently known methods of employing these formed signals suffer a problem that the output signals for driving antennae are insufficient in amplitude and have insufficient temporal sharpness, namely insufficiently fast rise-time, to enable sufficiently clear processing and analysis of reflected signals to determine with certainty whether or nor oil and/or gas deposits are present in a subterranean region.

The present invention therefore seeks to provide more cost effective and simpler methods of measuring geological formations using electromagnetic radiation.

SUMMARY OF THE INVENTION

An object of the present invention is to provide a more cost-effective electromagnetic geological metrology system.

A further object of the invention is to provide an electromagnetic geological metrology system which is capable of generating greater magnitudes of outbound radiation for interrogating geological formations.

According to a first aspect of the present invention, there is provided an electromagnetic geological metrology system as defined in appended claim 1: there is provided an electromagnetic geological metrology system comprising:
(a) a transmitter arrangement for generating outbound radiation towards a geological formation;
(b) a receiver arrangement for receiving reflected electromagnetic radiation reflected from the geological formation and generating corresponding one or more received signals; and
(c) a data processing arrangement for processing the one or more received signals,
characterized in that:
(d) the transmitter arrangement includes an antenna arrangement coupled via a switching arrangement to an energy storage arrangement; and
(e) the switching arrangement is operable to discharge energy stored in the energy storage arrangement for generating the outbound radiation.

The invention is of advantage in that the transmitter arrangement is capable of being implemented at reduced cost by using discharge technology in comparison to conventional approaches.

The invention is of further benefit in that the system is capable of providing enhanced magnitudes of outbound radiation for interrogating a geological region.

Optionally, the electromagnetic geological metrology system is arranged such that the energy storage arrangement is implemented by at least one of:

(f) an arrangement of one or more capacitors; and
(g) an inertial fly-wheel arrangement.

Such energy storage arrangements are relatively inexpensive and yet capable of delivering energy in a suitable manner for interrogating geological formations.

Optionally, in the electromagnetic geological metrology system, the arrangement of one or more capacitors includes a parallel arrangement of ceramic high-voltage capacitors. Such a parallel arrangement enables faster current pulse risetimes to be achieved and hence more precisely spatially defined outbound radiation for interrogating geological formations.

Optionally, in the electromagnetic geological metrology system is arranged such that the switching arrangement is implemented using at least one of:

(i) a mechanical electrical contact arrangement;
(j) a solid-state electronic device switching arrangement; and
(k) a gas-discharge switching arrangement.

Such switching arrangements are potentially inexpensive and are susceptible to being implemented in a robust manner for coping with high magnitudes of pulse discharge currents. The gas-discharge switching arrangement is beneficially implemented using one or more thyratrons. Thyratrons are manufactured by companies such as Perkin Elmer Inc., USA and by China Guoli Vacuum Electric, China. Such devices can conduct 1500 Amperes at a blocking voltage in an order of 35 kA, and can be disposed in parallel configurations for coping with greater peak currents. The solid-state electronic device switching arrangement is beneficially implemented using thyristors. For example, thyristors are manufactured by International Rectifier, USA which produces a ST3230C . . . R series of devices which can block potentials up 1800 Volts and switch currents up to 60 kiloAmperes (kA) peak. Several thyristors can be stacked in series to control higher potentials than 1800 Volts if required.

Optionally, in the electromagnetic geological metrology system, the switching arrangement, the antenna arrangement and the energy storage arrangement are mutually coupled together by a plurality of individually-insulated conductors, each the conductor having at least one dimension which is less than a skin-depth of current penetration into a material from which the conductor is fabricated at frequencies included in the outbound radiation. Implementing the conductors so that their skin-depth does not affect discharge current flow potentially results in more precisely defined spatial characteristics for the outbound radiation for interrogating the geological formation.

Optionally, the electromagnetic geological metrology system is adapted to be towed behind an aquatic vessel and generating the outbound radiation in an aquatic environment. Such an implementation allows for more economical discovery of off-shore subterranean oil and/or gas deposits.

Optionally, the electromagnetic geological metrology system is adapted to generate the outbound radiation such that the outbound radiation derives from one or more discharge pulses whose amplitude is susceptible to being varied in response to an amount of energy stored in the energy storage arrangement.

According to a second aspect of the invention, there is provided a method of generating outbound radiation in an electromagnetic geological metrology system comprising:

(a) a transmitter arrangement for generating the outbound radiation towards a geological formation;

(b) a receiver arrangement for receiving reflected electromagnetic radiation reflected from the geological formation and generating corresponding one or more received signals; and (c) a data processing arrangement for processing the one or more received signals, characterized in that the method includes steps of:

(d) implementing the transmitter arrangement to include an antenna arrangement coupled via a switching arrangement to an energy storage arrangement; and (e) discharging via the switching arrangement energy stored in the energy storage arrangement for generating the outbound radiation.

According to a third aspect of the invention, there is provided a software product stored on a data carrier, the software product being executable on computing hardware in conjunction with implementing the method pursuant to the second aspect of the invention.

It will be appreciated that features of the invention are susceptible to being combined in any combination without departing from the scope of the invention as defined by the appended claims.

DESCRIPTION OF THE DIAGRAMS

Embodiments of the present invention will now be described, by way of example only, with reference to the following diagrams wherein.

DESCRIPTION OF EMBODIMENTS OF THE INVENTION

In overview, the present invention is concerned with electromagnetic geological metrology systems for detecting subterranean oil and/or gas deposits which are susceptible to exhibiting electromagnetic characteristics. Moreover, the present invention is also concerned with methods of employing these systems for detecting such subterranean oil and/or gas deposits.

Figure 1:
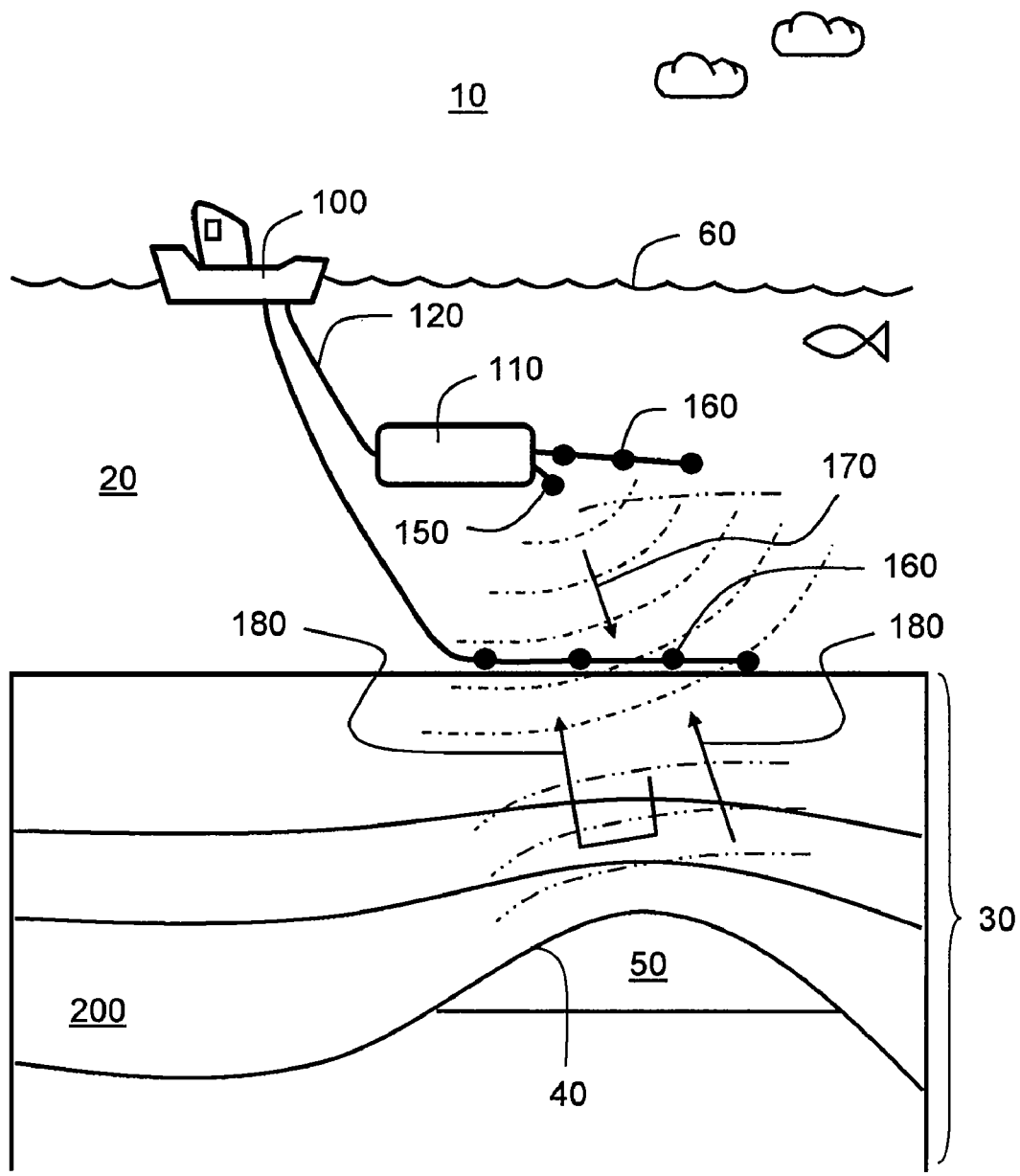
FIG. 1 is an illustration of a system pursuant to the present invention deployed for executing electromagnetic geological metrology from an aquatic environment.

In order that the present invention may be better understood, the invention will be initially described in overview with reference to FIG. 1 wherein a scene is depicted including an atmosphere 10, an ocean 20, and a subterranean region 30 including an anticline 40 in which oil and/or gas deposits 50 have accumulated. At a surface 60 of the ocean 20, an embodiment of a system pursuant to the present invention includes a ship 100 arranged to tow a metrology apparatus 110 via an umbilical connection 120.

The apparatus 110 includes a transmitter antenna 150 and one or more receiver antennae 160 suspended therefrom; optionally, the one or more receiver antennae 160 are susceptible to being located at an interface between the ocean 20 and the subterranean region 30, namely remote from the transmitter antenna 150. The transmitter antenna 150 is stimulated with pulses of energy from the apparatus 110 for emitting outbound electromagnetic radiation 170. The outbound electromagnetic radiation 170 propagates to a region of the anticline 40 whereat it is strongly reflected as complex multipath reflected radiation 180 on account of a difference in dielectric constant of the oil and/or gas deposit 50 in comparison to a layer of strata 200 forming the anticline 40. Moreover, the one or more receiver antennae 160 are deployed for receiving the multipath reflected electromagnetic radiation 180 and generating one or more received signals respectively. The received signals are fed back to the apparatus 110 whereat they are processed, for example spatially deconvolved in order to gather information describing the anticline 40 and a potential quantity of oil and/or gas present in the deposit 50. Such deconvolution is well known in the art and is employed, for example, when resolving seismic signals. The apparatus 110 is thereby capable of performing electromagnetic geological metrology upon the subterranean region 30.

Beneficially, the apparatus 110 and its associated support hardware, for example power generators, on board the ship 100 are beneficially separately earthed in respect of the ocean 20 relative to a remainder of the ship 100 so that, for example under fault conditions, discharge energy from the apparatus 110 is bypassed into the ocean 20 and does not result in discharge damage to the remainder of the ship 100. Such earth-connection safety is of importance when the apparatus 110 is operable to control discharge energies in an order of many hundred thousand Joules or more, for example potentially MegaJoules (MJ), of discharge energy.

In comparison the outbound electromagnetic radiation 170, the multipath reflected radiation 180 is of relatively low magnitude and is also potentially susceptible to interference from other extraneous sources of electromagnetic radiation. Thus, to improve detection signal-to-noise ratio, it is important that the one or more signals provided from the one or more receiver antennae 160 are amplified through high-quality low noise amplifiers and filters, whereafter the one or more amplified and filtered signals are digitized for being processed in computing hardware; beneficially, the low noise amplifiers are spatially mounted closely to their associated antennae 160. Moreover, it is also desirable that the outbound electromagnetic radiation 170 should include as much electromagnetic energy as possible simultaneously with having a suitable temporal characteristic with regards to its pulse rise-time for providing the apparatus 110 with enhanced spatial resolution when performing metrology of the subterranean region 30.

Figure 2:
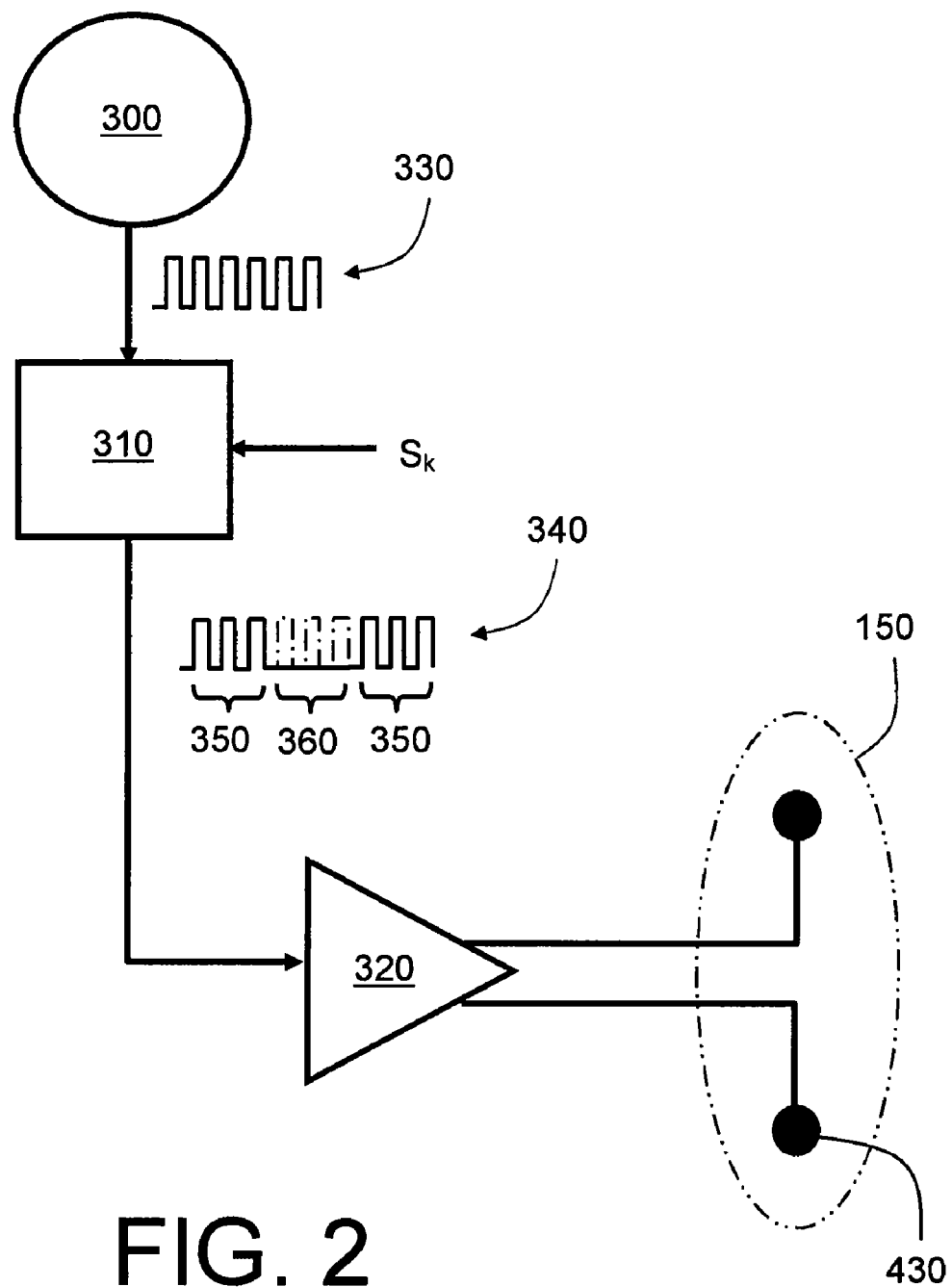
FIG. 2 is a schematic illustration of a known configuration for exciting a transmitter antenna for performing electromagnetic geological metrology.

The present invention is concerned with a manner in which the outbound radiation 170 is generated. Known electromagnetic metrology systems employ an arrangement as depicted in FIG. 2 for example. The arrangement of FIG. 2 includes a signal source 300 providing a continuous output signal indicated by 330; the continuous signal 330 is for example a square-wave signal. The output signal 330 is conveyed to a signal gate 310 which is modulated by a gating control signal $S_k$ to generate a gated signal 340 comprising groups of one or more transmitted pulses 350 and quiet periods 360 therebetween. The gated signal 340 is then provided to an amplifier 320 which is operable to amplify the gated signal 340 to generate an amplified version thereof for differentially exciting the transmitter antenna 150 for emitting the outbound radiation 170. In the quiet periods 360, the reflected radiation 180 is received at the one or more receiver antennae 160.

With respect to the present invention, the inventor has appreciated that the arrangement of FIG. 2 is unable to provide sufficient transmitted energy for reliably detecting presence of oil and/or gas in the deposit 50. A person ordinarily skilled in the art would select a more powerful amplifier 320, for example by coupling amplifiers in a parallel combination or a bridge combination to increase their combined output power. However, such a solution is very expensive in comparison to a magnitude of pulse energy which is required for generating sufficient pulse energy that is desirable for making improved quality measurements of the subterranean region 30.

The inventor has appreciated that electromagnetic pulses with acceptable waveform rise-times can be generated at the transmitter antenna 150 by causing a massive discharge between electrodes of the antenna 150 in contradistinction to convention approaches of employing gated amplified signals. Such a seemingly crude approach as proposed by the inventor would not be thought workable by a person of ordinary skill because such a person would not expect the electromagnetic radiation thereby generated to have characteristics which would be conducive to achieving high spatial resolution when performing geological metrology. Moreover, as will be elucidated later, producing a suitable form of outbound radiation 170 using discharge techniques is not straightforward and requires considerable engineering competence and ingenuity.

Figure 3:
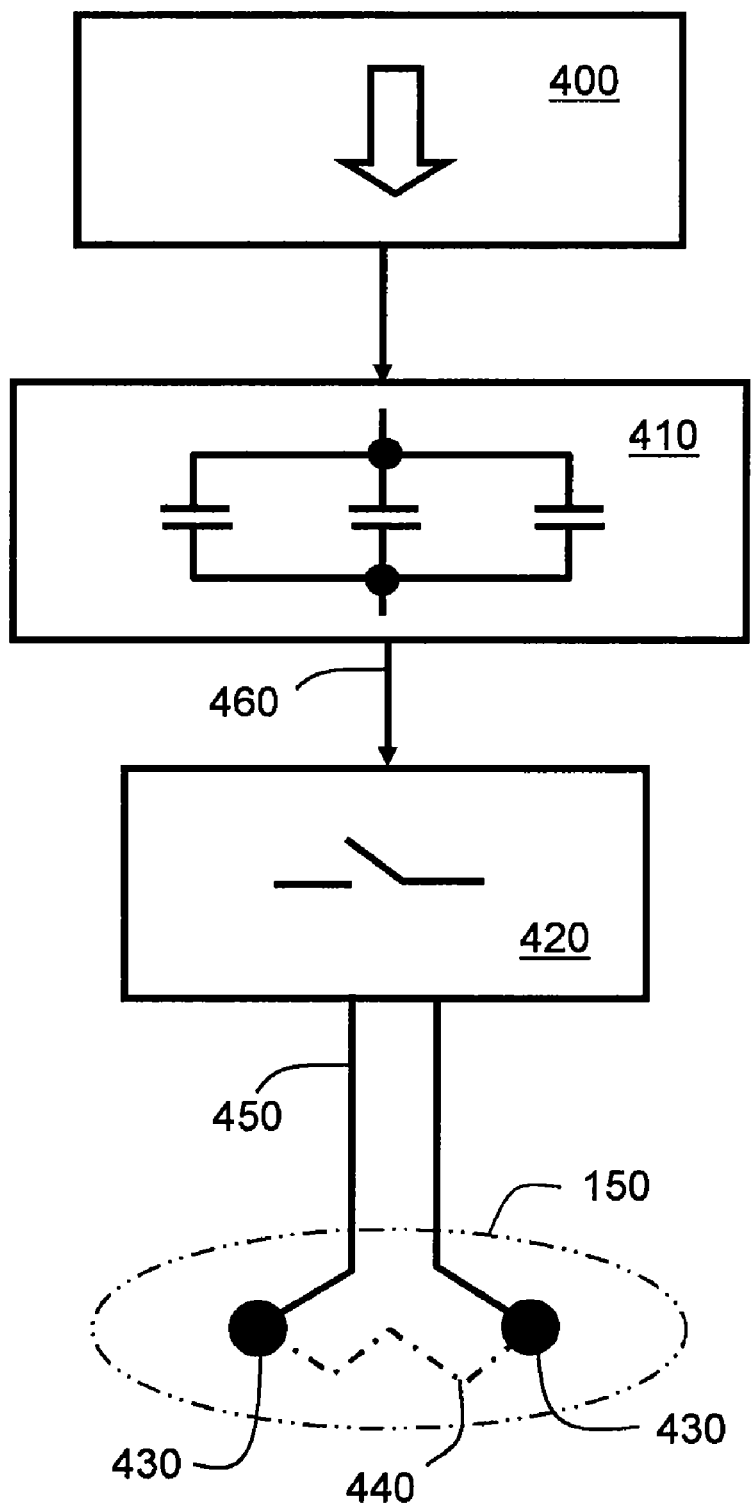
FIG. 3 is a schematic illustration of a configuration for exciting a transmitter antenna pursuant to the present invention for performing electromagnetic geological metrology.

Instead of employing the arrangement of FIG. 2, the inventor has devised an alternative arrangement as depicted in FIG. 3. The arrangement of FIG. 3 includes a charging source 400, an energy storage component 410 and a switching device 420. In operation, the charging source 400 is operable to store a quantity of energy within the energy storage component 410. An amount of energy stored is beneficially in a range of a few kilojoules (kJ) to many MegaJoules (MJ), for example in a range of 1 kilojoule to 100 MegaJoules, more preferably in a range of 0.5 MegaJoules to 20 MegaJoules. In operation, when the charging source 400 has charged the energy storage component 410, the charging source 400 is deactivated and then the switching device 420 is switched from a non-conducting state to a conducting state to rapidly discharge the energy stored in the energy storage component 410 to create an electrical discharge 440 across poles 430 of the transmitter antenna 150. By suitably designing the energy storage component 410, the electrical discharge 440 has an extremely fast temporal rise-time, for example in an order of microseconds.

Figure 4:
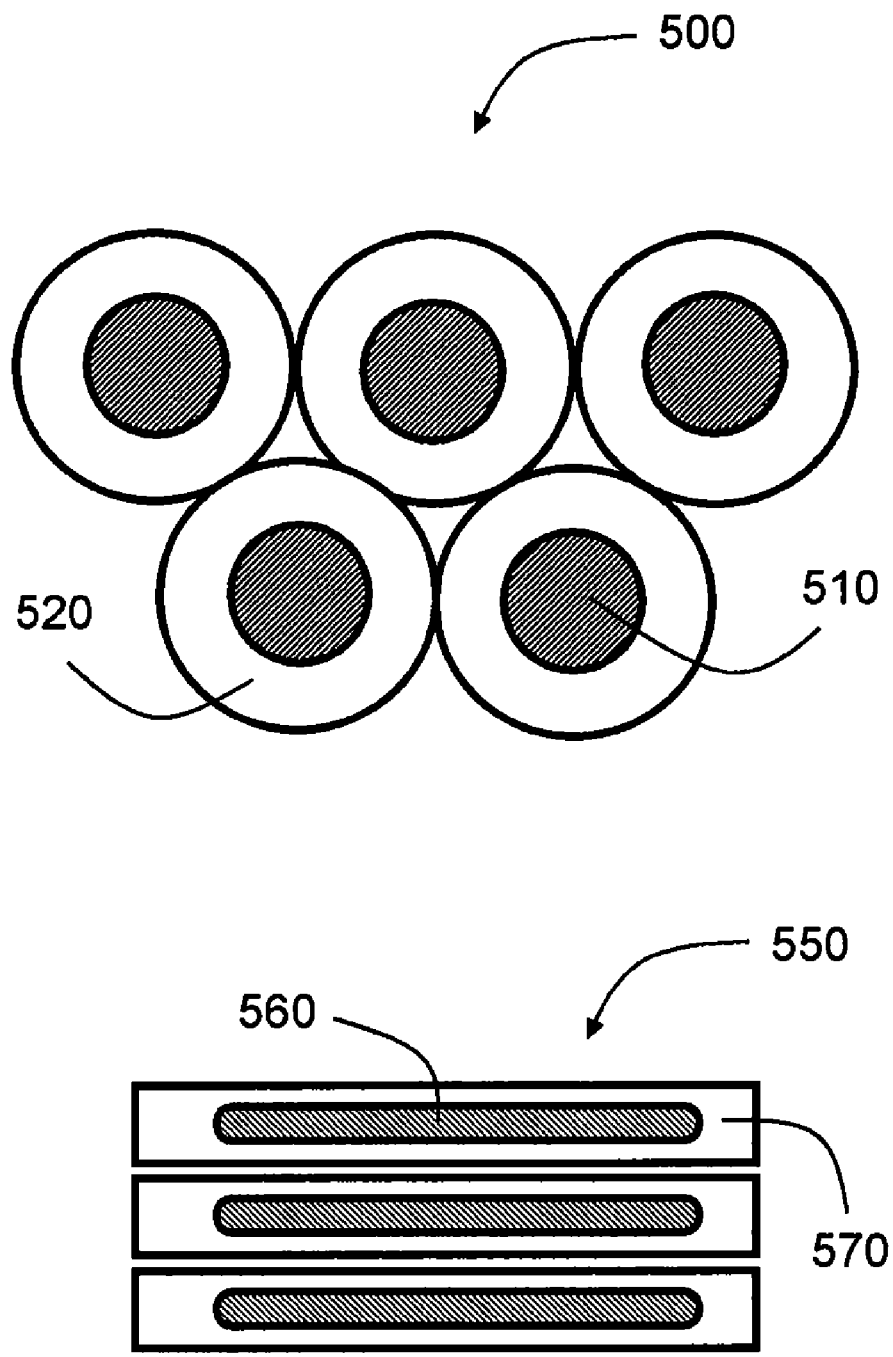
FIG. 4 is a schematic illustration of construction for current conductors employed in the system of FIG. 1 implemented in a manner pursuant to the present invention.

Advantageously, cables 460 from the energy storage component 410 to the switching device 420 are beneficially fabricated from a one or more bundles of individually-insulated wires or metal film strips, for example in a manner of Litzt wire, such that the wires or metal film strips have a thickness which is less than a skin-depth of current within the metal of the wires or strips at a maximum desired Fourier frequency component present in the transmitted radiation 170. In FIG. 4, a bundle of individually insulated wires is indicated generally by 500 wherein conductors are denoted by 510 and insulation layers are denoted by 520; the insulation is beneficially a class F insulation fabricated from a polymer material, for example from radiation-crosslinked polypropylene or similar polymer material. Moreover, the metal film strips are indicated generally by 550 and comprise a planar metal conductor 560 at least partially surrounded by a layer of insulation 570; the layer of insulation 570 is beneficially at least one of: an anodized metal layer, a polymer layer, a ceramic layer. The individually insulated wires 520 preferable each have a diameter of 0.5 mm or less, and the strips beneficially have thickness of 0.2 mm or less, although the strips can beneficially have a width of several centimeters.

Moreover, cables 450 connecting from the switching device 420 to the antenna 150 are beneficially also fabricated from one or more bundles of individually insulated wires or strips so as to obtain as low a resistance as possible with increasing frequency, thereby preserving pulse shape and its associated fast rising edge which so important for achieving fine spatial resolution when performing geological metrology.

In one embodiment of the present invention, the energy storage component 410 is beneficially implemented as a bank of one or more capacitors mounted within the apparatus 110. Beneficially the one or more capacitors are fabricated to have a low inductance and be capable of handling large surge currents. Ceramic capacitors of a type employed in high voltage electrical power distribution networks are suitable for use, for example, when constructing the energy storage component 410; such capacitors are required to survive lightening strike surges of energy and are therefore built to be inherently robust and survive extremely high peak currents flowing therethrough in a order of ten's of kiloAmperes. Suitable capacitors are manufactured by High Energy Corp., Parkesburg, Pa. 19365, USA whose EPSR series of capacitors have working voltages in a range of 20 kV to 50 kV, and are designed for use, for example, in lightening arrestor systems.

Figure 5:
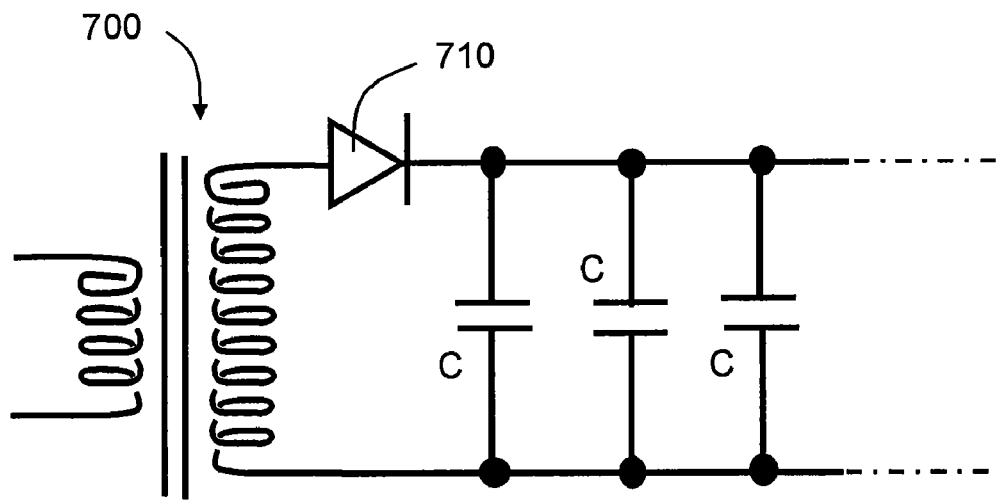
FIG. 5 is a schematic diagram of part of a charging arrangement employed in the system of FIG. 1.

Moreover, in order to reduce a series resistance exhibited by the energy storage component 410 when delivering its current during rapid discharge, the one or more capacitors are beneficially coupled in a parallel configuration. Beneficially, the ceramic capacitors have a voltage rating of several kilovolts, for example in a range of 1 kV to 20 kV. Alternatively, the capacitors are implemented in a plate formation with polymer insulation, for example polyester or polypropylene insulation. Beneficially, the energy storage component 410 is capable of storing many Joules of energy, for example in a range of 0.5 MegaJoules to 20 MegaJoules; for a storage capacity of 20 MegaJoules at 20 kiloVolts (kV), the one or more capacitors have an overall capacitance of 50 milliFarads (mF). When the energy storage component 410 is implemented using one or more capacitors, the charging source 400 is beneficially implemented using one or more high-frequency switch-mode inductive transformers 700 provided with high-voltage solid-state rectification 710, for example in a form of fly-back recharging circuit, for charging the capacitors C of the energy storage component 410 as illustrated schematically in FIG. 5. Other charging arrangements are feasible such as high-frequency Cockcroft-Walton stacks implemented using a network of capacitors and solid-state diodes.

Figure 6A:
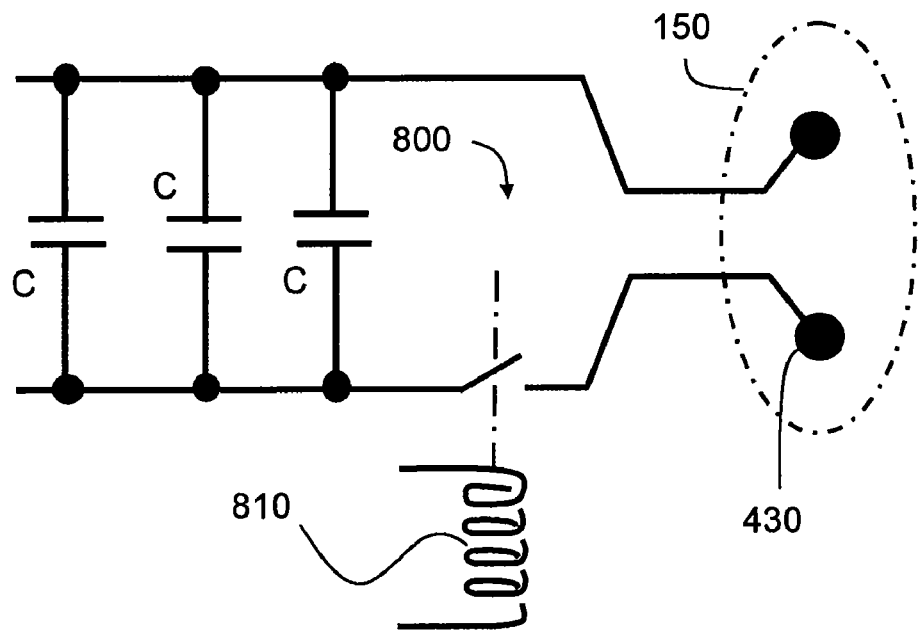
FIGS. 6a and 6b are schematic diagrams of a capacitive energy storage component and a first type of discharging device for use in implementing the present invention.
Figure 6B:
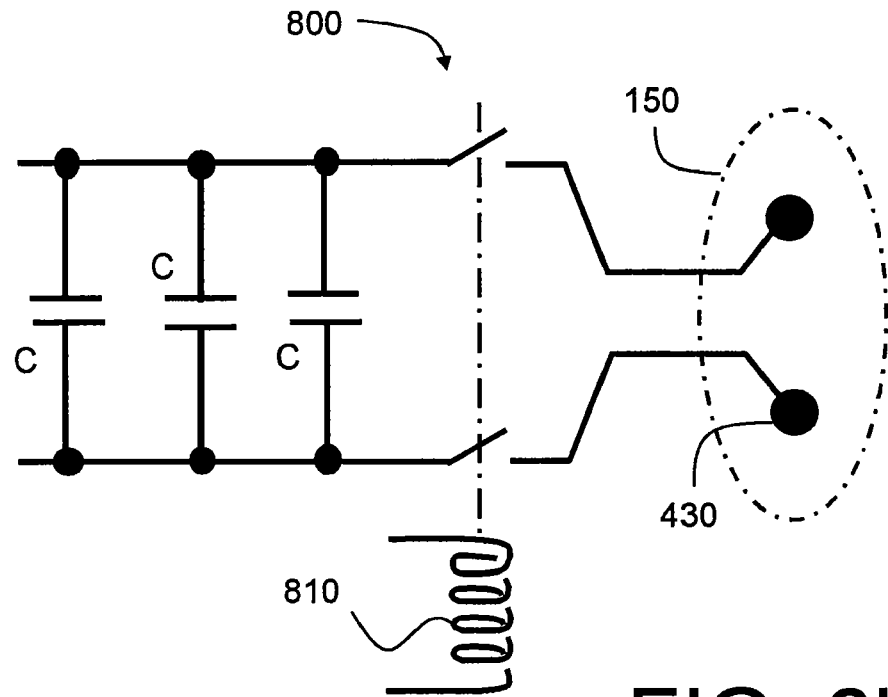
Figure 7A:
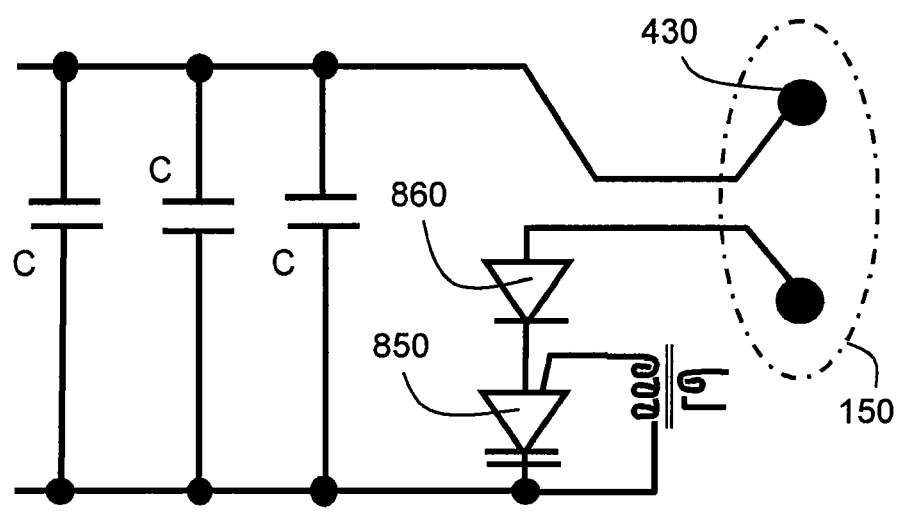
FIGS. 7a and 7b are schematic diagrams of a capacitive energy storage component and a second type of discharging device for use in implementing the present invention.
Figure 7B:
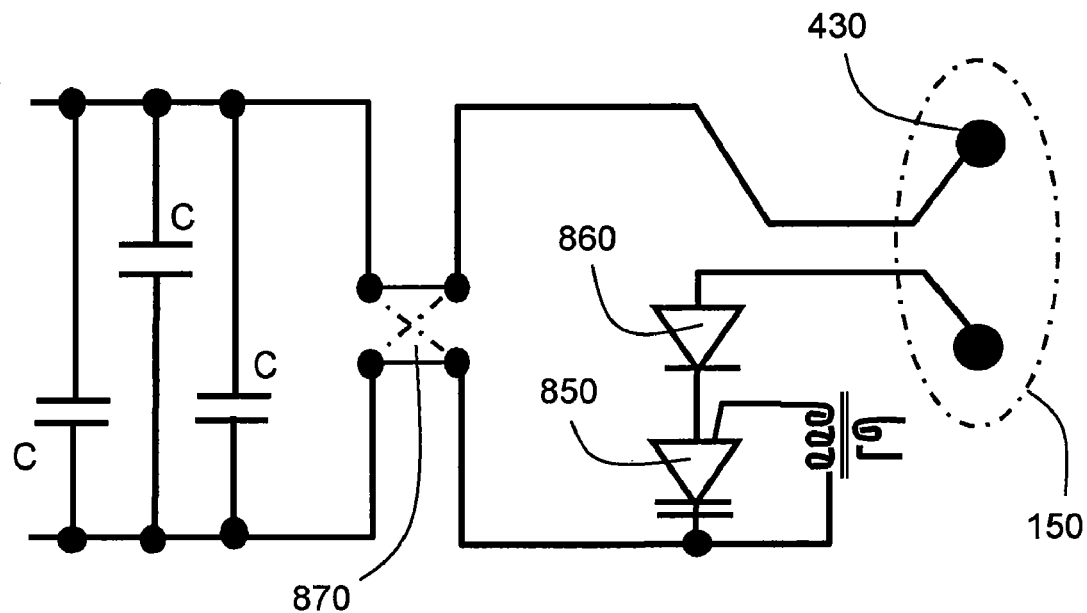

The switching device 420 is beneficially implemented using a mechanical 1-pole or 2-pole relay switch indicated by 800 in FIGS. 6a and 6b respectively provided with a magnetic actuator 810, or by using solid-state electronic devices such as a thyristor 850 in series with one or more diodes 860 as illustrated in FIGS. 7a and 7b. A mechanical 1-pole relay switch is potentially capable of resulting in shorter durations to the rising edge of pulses in comparison to employing a 2-pole relay switch; however, a 2-pole relay switch provides a greater degree of isolation during charging of the capacitors C in respect of the transmitter antenna 150. Yet alternatively, the switching device 420 is implemented as one or more gas-discharge switching devices such as deuterium-filled thyratrons. Thyratrons are manufactured by companies such as Perkin Elmer Inc., USA and by China Guoli Vacuum Electric, China. Such thyratron devices are able to conduct 1500 Amperes at a blocking voltage in an order of 35 kA, and can be coupled in parallel configurations for coping with greater peak currents. The solid-state electronic devices are beneficially implemented using thyristors or triacs; thyristors are also known as silicon controlled rectifiers (SCR); triacs are essentially bi-directional silicon controlled rectifiers. For example, thyristors are manufactured by International Rectifier, USA which produces a ST3230C . . . R series of devices which are able to block potentials up to 1800 Volts and switch peak currents up to 60 kiloAmperes (kA). Several thyristors can be stacked in series to control higher potentials than 1800 Volts if required; for example twenty such thyristor devices can be coupled in series to block 20 kV potentials. The thyristor 850, alternatively stack of thyristors, and its associated one or more diodes 860 are beneficially duplicated so that each half cycle of electrical oscillation can be individually controlled as will be elucidated in more detail later. Such control of half cycles is also achievable by employing an arrangement as depicted in FIG. 7b, wherein a change-over switch 870; for example implemented as a mechanical change-over switch, is included so that the thyristor 850 is operable to conduct energy from positively charged electrodes of the capacitors C to negatively charged electrodes thereof. Such economical reuse of stored energy when forming pulses is important; for example, when the capacitors C store many MegaJoules of energy and the apparatus 110 is configured to generate a current pulse across the antenna 150 every 6 seconds, such that an energy flow in an order of many hundreds of kilowatts occurs. Efficient reuse of discharge energy is thus important so that the charging source 400 does not need to be larger than absolutely necessary on grounds of cost. The apparatus 110 is beneficially operable to deliver pulses to the antenna 150 at a rate in a range of 1 pulse per 2 seconds to 1 pulse per hour.

Figure 8:
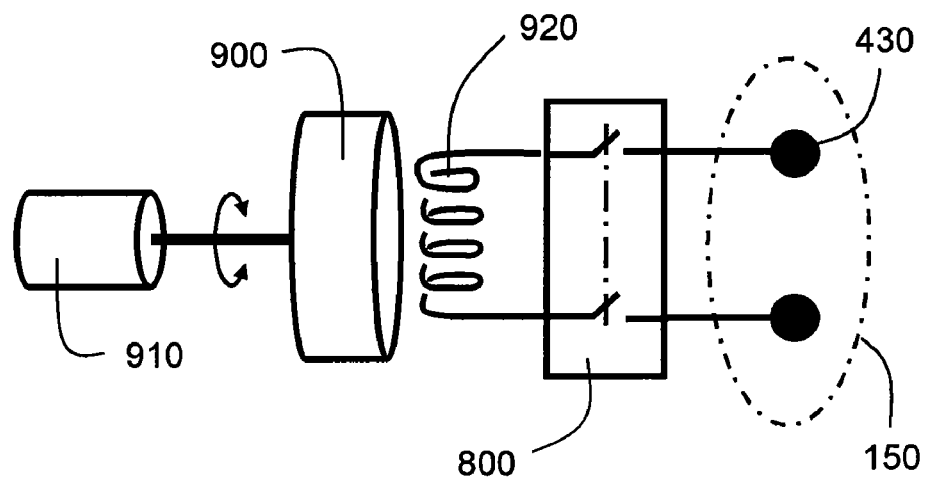
FIG. 8 is a schematic diagram of an inertial energy storage component and an associated discharge device for use in implementing the present invention.

In another embodiment of the present invention, the energy storage element 410 is implemented as a flywheel 900 coupled to a generator 920, and the charging source 400 is an electric motor 910 for spinning the flywheel 910 as illustrated in FIG. 8. Beneficially, the flywheel 900 is vacuum-mounted to reduce air drag upon it when rotated. In operation, the flywheel 900 is rotated to a high speed, for example in a range of 10000 r.p.m., to 100000 r.p.m., and then the switching device 420, for example implemented as a 1-pole or 2-pole switch or solid-state switching arrangement, is activated to transfer inertial rotational energy of the flywheel 900 to the antenna 150 for generating the outbound radiation 170.

The capacitors C, and an inductor L formed by a series combination of the antenna 150 and its associated connection leads to the capacitors C form a resonant circuit which has a frequency of resonance f define by Equation 1 (Eq. 2):

$$f = \frac{1}{2\pi\sqrt{LC}} \qquad \text{Eq. 1}$$

Discharge of the energy storage component 410 is beneficially halted after a half cycle, after a complete cycle or after several cycles depending upon requirements when generating the outbound radiation 170. Generating just a half cycle pulse is of benefit in that ft generates a spatially well-defined wavefront for the outbound radiation 170.

Thus, the apparatus 110 includes a source of energy and is operable to discharge the energy as an electromagnetic field forming the outbound radiation 170. The source includes a quantity of energy which is discharged through an electrically conductive material, for example sea water, in rock or even in air. In the forgoing, discharge in sea water is elucidated in detail. The quantity of energy is available by using one or more energy banks, for example implemented as capacitors or rotating generator arrangements. The one or more energy banks are effectively short-circuited for discharge via two or more electrodes. The electrodes are in contact with an electrically conductive medium. A spatial distance between the two or more electrodes can be varied as required, for example for fine tuning a form of the outbound radiation 170. Discharge of the one or more energy banks generates the outbound radiation 170 as a powerful impulse.

The discharge is susceptible to being repeated symmetrically or asymmetrically, and with varied amplitude in response to an amount of energy stored in the energy storage element 410. Moreover, the antenna 150 is susceptible to being varied in configuration, for example to comprise a series of discharge gaps or an annular discharge gap. Discharge can be implemented with similar or differential potentials across the electrodes 430 of the antenna 150 when implemented with more than two electrodes.

Time intervals between recharging the energy storage component 410 and discharging the energy storage component 410 can be varied when performing metrology on the subterranean region 30. A elucidated in the foregoing, the apparatus 110 is capable of applying pulses to the antenna 150 at a frequency up to substantially 1 pulse per second.

Figure 9:
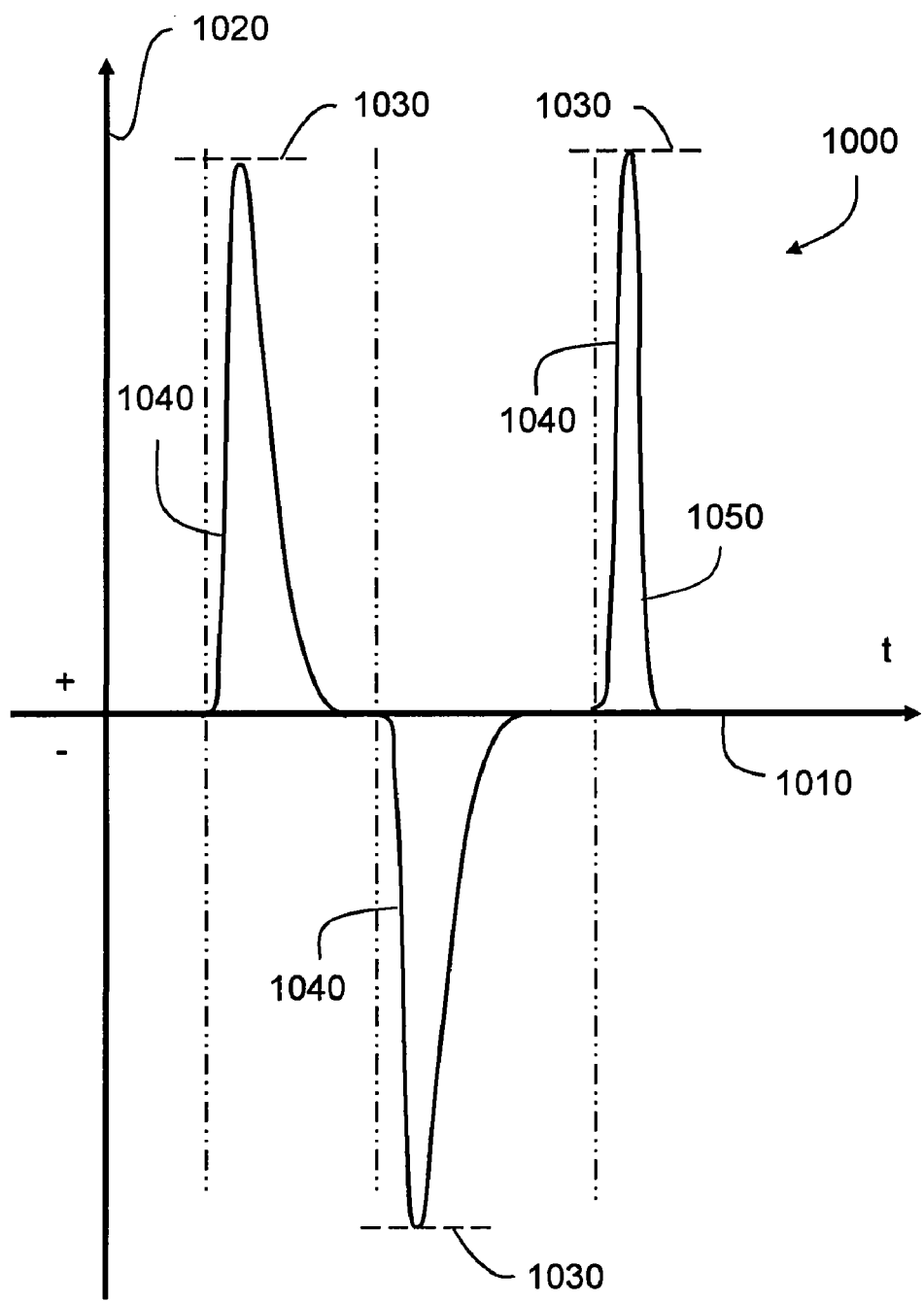
FIG. 9 is a graph illustrating discharge current peaks generated in the system of FIG. 1.

The aforesaid system pursuant to the invention can be calibrated by employing a method which will now be described with reference to FIG. 9. Referring to FIG. 9, there is shown a graph of discharge characteristics of the system pursuant to the invention; the graph is indicated generally by 1000 and includes an abscissa axis 1010 denoting passage of time t, and an ordinate axis 1020 denoting discharge current between the electrodes 430 of the antenna 150. Beneficially, discharge is controllable in both directions of current flow as denoted by the first and second discharge current peaks 1040 from left to right; for example, an arrangement as depicted in FIG. 7b can be used to control discharge of half cycles. A maximum amplitude 1030 of the peaks is controllable by controlling an amount of energy stored in the energy storage component 410. Moreover, by controlling discharging characteristics, it is also feasible to modify a duration of the peaks as illustrated in the third peak denoted by 1050.

Expressions such as "has", "is", "include", "comprise", "consist of", "incorporates" are to be construed to include additional components or items which are not specifically defined; namely, such terms are to be construed in a non-exclusive manner. Moreover, reference to the singular is also to be construed to also include the plural. Furthermore, numerals and other symbols included within parentheses in the accompanying claims are not to be construed to influence interpreted claim scope but merely assist in understanding the present invention when studying the claims.

Modifications to embodiments of the invention described in the foregoing are susceptible to being implemented without departing from the scope of the invention as defined by the appended claims.

The invention claimed is:

1. An electromagnetic geological metrology system comprising:
    (a) a transmitter arrangement for generating outbound radiation towards a geological formation;
    (b) a receiver arrangement for receiving reflected electromagnetic radiation reflected from the geological formation and generating corresponding one or more received signals; and
    (c) a data processing arrangement for processing said one or more received signals, characterized in that:
    (d) said transmitter arrangement includes an antenna arrangement coupled via a switching arrangement to an energy storage arrangement; and
    (e) said switching arrangement is operable to discharge energy stored in said energy storage arrangement for generating said outbound radiation,
    wherein said switching arrangement is implemented using at least one of:
    (i) a mechanical electrical contact arrangement;
    (j) a semiconductor switching arrangement; and
    (k) a gas-discharge switching arrangement.

* * * * *